Patented July 30, 1935

2,009,778

UNITED STATES PATENT OFFICE 2,009,778

COATING MATERIAL

Alfred L. Kronquest and Samuel C. Robison, Syracuse, N. Y., assignors to Continental Can Company, Inc., New York, N. Y., a corporation of New York No Drawing. Application April 4, 1931, Serial No. 527,858. Renewed October 27, 1934

8 Claims. (Cl. 134—54)

This invention relates to a coating material which is particularly adapted for the sealing of cans and similar containers which are vacuumized but not subject to heat treatment.

Various compositions have been proposed for sealing containers such as cans for the purpose of preventing the entry of air or the emission of vaporous or volatilized portions of the can contents. In packing materials in vacuum, which materials are not subjected to a heat treatment, it is found that coating materials, which normally are excellently adapted for closure purposes, have the disadvantage that at times the seaming or other closing operation does not produce a tight seal. For example, the can cover may be manufactured and provided with the usual ring of coating material and the latter allowed to dry. This can cover may remain in storage for a considerable period of time before it is applied to and seamed upon the can body. During this period, practically all of the volatile solvent escapes from the coating material and the latter has a more or less dry surface which is not adhesive to the can body, and since there is no heat processing, the material is not reduced to a tacky condition in which it establishes an adhesive seal to the body.

It is therefore found desirable, according to the present invention, to provide a coating material which is characterized by remaining slightly tacky for an extended period of time, as for example, twelve months.

Further, it has been found that this tackiness can be obtained in an unusual way, to wit: by modifying the rubber intended for forming a coating material before it is introduced into a solvent to form a rubber solution.

It is preferred to make the material by combining the ingredients to form a dough, which occupies but a relatively small space and can easily be stored and shipped. At the time of the employment the dough is diluted or extended by the employment of a suitable volatile solvent until it has the consistency of a cream. This creamy coating material is then employed in the usual manner except that it remains tacky for an extended period of time, and able to adhere to a surface brought in contact therewith.

This tackiness is produced according to he present invention by milling the rubber with zinc oxide prior to its solution in a volatile solvent to form the rubber solution. Zinc oxide is customarily regarded as an inert filler for rubber mixtures, but it has been found that by grinding or milling the rubber with the zinc oxide as a preliminary step, the final coating material is characterized by this tackiness even after the evaporation of the volatile solvents present.

A preferred formula for the manufacture of the dough is as follows:

Rubber solution _____ 100 lbs.
Zinc oxide _____ 320 lbs.
Adhesive ester gum_____ 75 lbs.
Liquid petrolatum_____ 30 lbs.
Antioxidant _____ 1 lb. 2 oz.

The rubber solution employed contains approximately 2 pounds of rubber to 4½ pounds of naptha as a solvent. This rubber is employed to give elasticity to the compound and permit it to yield during seaming operations and thus fill and pack the space between the cover and container. Prior to the solution of the rubber in the naptha as a solvent, the smoked sheets of rubber (first estates) are milled in a masticator mill with about 80 pounds of the zinc oxide of the above formula. This mixture of rubber and zinc oxide is then dissolved in the naphtha, and then the remaining 240 pounds of zinc oxide and the other ingredients are introduced and mixed in a mixer until a uniform mixture results which is called "coating dough" and has substantially the consistency of putty. In addition to the function of the initial portion of zinc oxide, the entire quantity of zinc oxide operates as a filler in the final material. Zinc oxide is chosen as a filler because of its natural affinity for the rubber, and being basic, it reacts with the naturally occurring resins in the rubber to form zinc soaps. The compounds thus formed tend to activate the accelerator. Owing to this affinity, and by reason of the fineness of subdivision of the zinc oxide, the mixtures tend to remain in suspension and not separate out upon standing, as other pigments may. The zinc oxide has the further faculty of preventing the "black" formation on the inside of the can around the double seam.

The adhesive ester gum is employed to effect the adhesion of the coating to the tin plate or other surface upon which the coating is employed; and the form commercially known as "Malay gum" is excellently adapted for the purpose. The liquid petrolatum is a plasticizer for the rubber and gum and serves to make the material more plastic and pliable, and hence better adapted to fulfill its function of packing the space between the can and cover when so employed.

The antioxidant is employed to prevent deterioration of the rubber by oxidation. Various materials are adapted for this use, all serving to prevent the hardening of the mixture in the course of time. It has been found that the material containing 92.5% of phenyl-alpha-naphthylamine and 7.5% of metatoluylenediamine, and commercially available under the name "Neozone C" is excellently adapted for the purpose.

When it is desired to employ the coating dough, it is again placed in a suitable mixer in the ratio of 100 pounds of dough to around 16 gallons of a suitable volatile solvent such as benzol, naphtha or other suitable organic solvent for the rubber, gum and petrolatum, and stirred until a uniform mass results which usually has the consistency of a thick cream. It is obvious that greater or lesser proportions of solvent may be employed according to the exact consistency desired.

The coating material may then be placed upon the tin plate where it evaporates rapidly and deposits an elastic film tightly adherent to the tin plate. Even after many months time, the surface of the film is tacky and adheres well to tin or like materials which are forced down upon it.

It is obvious that the invention may be modified in many ways both as to the selection of ingredients and to the quantities employed without departing from the spirit of the appended claims.

We claim:

1. A coating material including in combination, rubber which has been milled with zinc oxide prior to solution in substantially the ratio of 30 parts of rubber to 80 parts of zinc oxide, an adhesive ester gum, and a plasticizer for the rubber and gum.

2. A coating material including in combination, rubber which has been milled with zinc oxide prior to solution in substantially the ratio of 30 parts of rubber to 80 parts of zinc oxide, an adhesive ester gum, and a plasticizer for the rubber and gum, and a volatile solvent for the rubber and gum.

3. A coating material including in combination, the modified rubber made by milling sheet rubber with zinc oxide in substantially the ratio of 30 parts of rubber to 80 parts of zinc oxide, an adhesive ester gum, and a plasticizer for the rubber and gum.

4. A coating material including in combination, the modified rubber made by milling sheet rubber with zinc oxide, adhesive ester gum, a plasticizer for the rubber and gum, and an inorganic filler, in a volatile solvent for the rubber and gum.

5. The method of making a tacky coating material which comprises milling sheet rubber with zinc oxide in substantially the ratio of 30 parts of rubber to 80 parts of zinc oxide, subsequently effecting a colloidal solution of the material by mastication with a volatile solvent, and incorporating therein an adhesive gum and a plasticizer.

6. A process as in claim 5 in which additional zinc oxide is introduced into the solution.

7. The method of making a coating dough which comprises milling 30 parts by weight of sheet rubber with approximately 80 parts by weight of zinc oxide, dissolving the mixture of rubber and zinc oxide in approximately 70 parts by weight of volatile solvent for the rubber, and incorporating therein approximately 75 parts by weight of adhesive ester gum, 30 parts by weight of liquid petrolatum, and substantially 240 further parts of zinc oxide.

8. A composition for coating can ends for forming seals, including rubber which has been milled with zinc oxide prior to solution in substantially the ratio of 30 parts of rubber to 80 parts of zinc oxide, an adhesive ester gum, additional zinc oxide, and a plasticizer for the rubber and gum in a volatile organic solvent for the rubber and gum.

ALFRED L. KRONQUEST.
SAMUEL C. ROBISON.